July 31, 1962  E. J. H. FIALA  3,047,180
BALANCING MECHANISM FOR A LID, MORE PARTICULARLY FOR THE LID
OF THE LUGGAGE COMPARTMENT OR THE MOTOR
COMPARTMENT OF A VEHICLE
Filed April 16, 1959
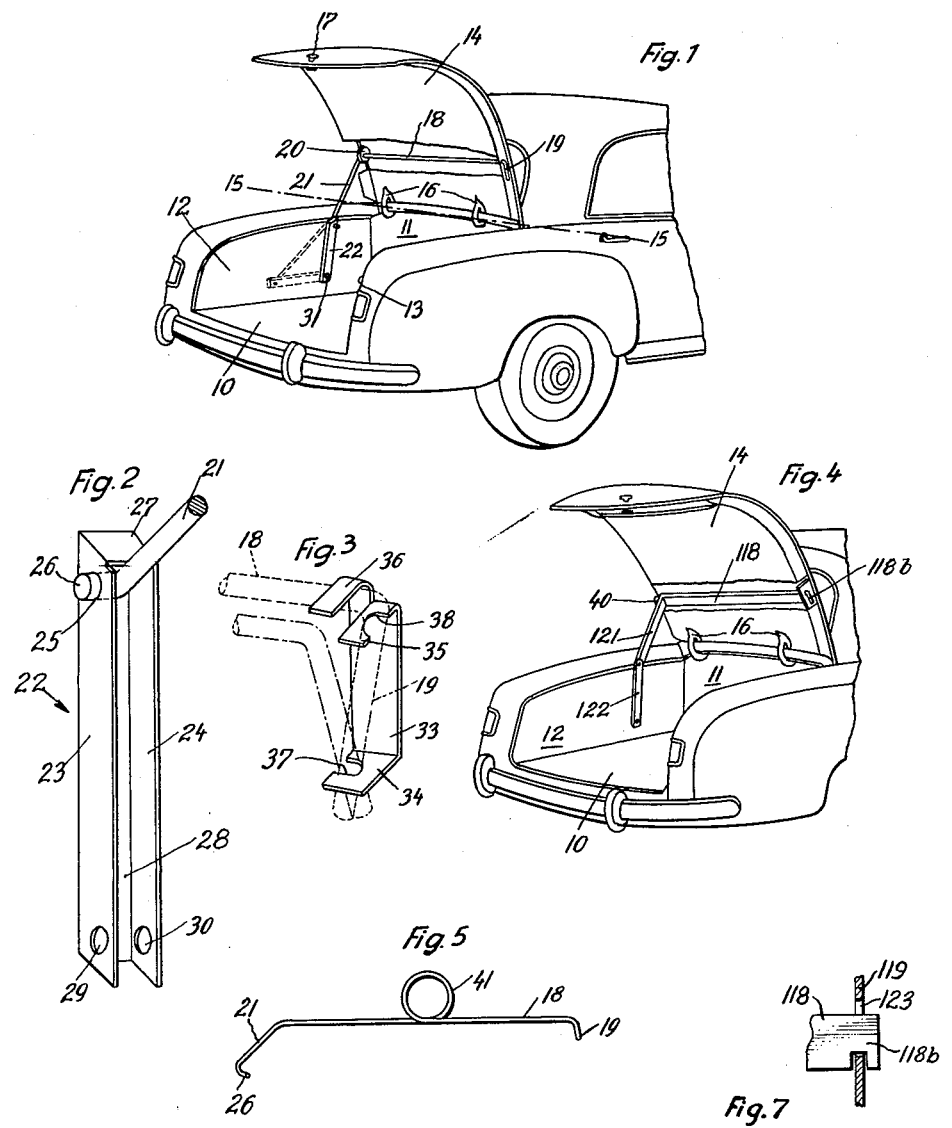
Inventor
ERNST J. H. FIALA
BY 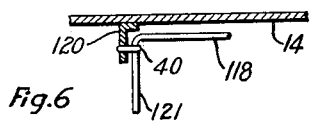
ATTORNEYS _United States Patent Office_ 3,047,180
Patented July 31, 1962

3,047,180
BALANCING MECHANISM FOR A LID, MORE PARTICULARLY FOR THE LID OF THE LUGGAGE COMPARTMENT OR THE MOTOR COMPARTMENT OF A VEHICLE
Ernst J. H. Fiala, Sindelfingen, Kreis Boblingen, Germany, assignor to Daimler-Benz Aktiengesellschaft, Stuttgart-Unterturkheim, Germany
Filed Apr. 16, 1959, Ser. No. 806,797
Claims priority, application Germany Apr. 16, 1958
7 Claims. (Cl. 217—60)

My invention relates to an improved balancing mechanism for balancing the weight of a lid, particularly of the lid of the luggage compartment or the motor compartment of a motor vehicle.

It is the object of my invention to provide a balancing mechanism of the kind indicated which is of greater simplicity than prior mechanisms of this type and may be produced at a low cost and may be readily assembled and disassembled.

More particularly, it is the object of the invention to provide an improved balancing mechanism including a torsional spring rod mounted on the lid and operative to fully balance the weight of the lid, when the lid approaches its lowermost position, and to exert a lifting couple upon the lid, when the lid approaches its uppermost position.

Finally, it is an object of my invention to provide an improved balancing mechanism of the kind indicated including a torsional spring rod mounted on the lid in such a manner that the torque exerted by the spring rod always substantially equals the couple produced by the supporting force about the pivotal axis of the lid, whereby the lid is nearly fully relieved of any twisting forces.

Further objects of my invention will appear from a detailed description of a number of embodiments of my invention following hereinafter with reference to the drawings, it being understood, that the terms and phrases used in such detailed description have been chosen for the purpose of illustration rather than that of restriction or limitation of the invention. The features of novelty for which patent protection is sought will be pointed out in the appended claims.

In the drawings,

FIG. 1 is a perspective view of the rear end of a motor vehicle having a luggage compartment, the lid of such compartment being provided with my improved balancing mechanism and being shown in opened condition, FIG. 2 is a perspective view of a link viewed from the right with reference to FIG. 1, FIG. 3 is a perspective view of a bracket shown on a larger scale than that used in FIG. 1, FIG. 4 is a perspective view similar to that of FIG. 1 of another embodiment of my invention, FIG. 5 illustrates a modification of the torsional spring bar shown in FIG. 1, FIGURE 6 shows in greater detail the rotatable connection of one end of the torsional spring rod shown in FIGURE 4, and FIGURE 7 shows in greater detail the non-rotatable mounting of the other end of the torsional spring rod shown in FIGURE 4.

The rear end of the motor vehicle illustrated in FIG. 1 is provided with a luggage compartment composed of a bottom wall 10, of a rear wall 11, and of side walls 12 and 13. A lid 14 is mounted for pivotal movement about an axis 15—15 extending in proximity to the top edge of the rear wall 11 by means of hinges 16 having elements fixed to the lid and elements fixed to the body of the vehicle. The lid is provided with the conventional latching mechanism 17 cooperating with a keeper mounted on the body near the rear edge of the bottom wall 10 of the compartment. The lid 14 is composed of an outer sheet and of an inner sheet spaced therefrom. Within the space between said sheets a torsional spring rod 18 extends substantially parallel to the axis 15—15 at a distance therefrom and has its one end 19 fixed to the lid 14, whereas the other end of the spring rod 18 is rotatably mounted in a bearing 20 fixed to the lid. An arm 21 is fixed to the end of the spring rod 18 extending through the bearing 20, such arm 21 extending towards the bottom wall 10. A link 22 extending substantially parallel to the side wall 12 has its lower end pivotally mounted on the side wall 12 or on the bottom wall 10, whereas the other end of the link 22 is pivotally connected to the lower end of the arm 21.

Preferably, the arm 21 is integral with the spring rod 18, a rod being bent at a right angle to form both the torsional spring 18 and the arm 21.

A preferred form of the link 22 is illustrated in FIG. 2 showing that the link is formed by a sheet metal member of U-shaped cross section having a pair of spaced web portions 23 and 24, the web portion 23 being provided with an aperture 25 near its upper end. The arm 21 extends between the web portions 23 and 24 and has a bent end portion 26 which is journaled in the aperture 25. Moreover, the link 22 is provided with an abutment 27 limiting the angle of oscillation of the arm 21 relative to the link 22 so as to prevent a straightening of the toggle formed by the arm 21 and the link 22. In the embodiment shown the abutment 27 is formed by an extension of the base portion 28 of the link 22, such base portion being folded over into contact with the top edges of the web portions 23 and 24 and being slightly shorter than the width of the web portions 23 and 24. For the purpose of preventing accidental disengagement of the end portion 26 of the rod 21 from the aperture 25, the end portion 26 of the rod projects from the aperture 25 a longer distance than the distance by which the web portion 24 is spaced from the rod 21. For the purpose of assembly the rod 21 must be slightly turned when its bent end 26 is inserted in the aperture 25 and the webs 23, 24 must be flexed apart slightly in this operation. Moreover, the end portion 26 of the rod may be provided with a peripheral groove for engagement by the edge of the aperture 25. Near the lower end of the link 22 the web portions 23 and 24 are provided with aligned holes 29 and 30 for engagement of a pivot pin 31 projecting from the side wall 12 of the compartment.

The end portion 19 of the spring rod constituting the end thereof that is fixed to the lid 14 is preferably bent to extend at an angle to the rod 18, such angle preferably amounting to substantially 90°. A U-shaped bracket composed of a web portion 33 and of arm portions 34, 35 and 36 serves to fixedly hold the end 19 of the spring rod. Preferably, the web portion 33 is fixed to the inner surface of the outer sheet of the lid 14 so as to extend substantially parallel to the side edge of the lid, the arm portions 34, 35 extending downwardly, when the lid is in closed condition. The third arm 36 is spaced from the second arm 35 transversely of the spring rod 18 and the latter extends between the arms 35 and 36. The first arm 34 has a recess 37 in its inner edge and the second arm 35 has a recess 38 in its outer edge. These recesses 37 and 38 are engaged by the end portion 19 of the spring rod. Hence, it will appear that the third arm 36 overlies the spring rod 18, whereas the second arm 35 underlies the spring rod 18, thus preventing axial displacement of the end portion 19.

The bracket 33–36 affords simple assembly of the spring rod subsequent to the pivotal attachment of the lid 14 to the body of the vehicle and even after attachment of the inner sheet to the lid 14. In this assembly the end portion 19 of the rod which preferably extends at right angles to the arm 21 is introduced through the bearing 20, whereupon the spring rod 18 is slipped into the internal space between the sheets of the lid until the end portion 19 abuts the arms 34, 35 of the bracket. Thereupon the spring rod is brought into the position shown in FIG. 3 in dash-dotted lines and the lower end of the portion 19 is placed into the recess 37. Thereupon, axial thrust is applied to the spring rod 18 to slightly flex the end portion 19 permitting it to be slipped over the arm 35 until it snaps into the recess 38. In this operation the spring rod 18 is guided into the space between the arms 35 and 36. In this manner, the end of the spring rod 18 shown in FIG. 3 is fixedly held against axial displacement or rotary displacement within the bracket 33–36. Thereupon, the link 22 is fixed to the lower end of the arm 21 in the manner described hereinabove and, finally, the pivot pin 31 will be slipped through the holes 29 and 30 and will be put in place.

When the lid 14 is closed, the elements 21 and 22 will move into the position shown in FIG. 1 in dotted lines.

In the embodiment of my improved balancing mechanism illustrated in FIG. 4 the torsional spring rod 118 and its arm 121 are formed by a single leaf spring bent at a right angle and provided with a bearing pin 40 near its bend at the outside thereof. Bearing pin 40 rotatably connects spring rod 118 and arm 121 to a bearing member 120 which is secured to lid 14. The end 118b of the leaf spring engages a suitable opening 123 provided in a bracket 119 fixed to the inside of the lid. Axial displacement of the leaf spring 118 in this bracket is prevented by engagement of a portion of the bracket 119 with a recess provided in the leaf spring adjacent end 118b.

The bearing 120 may be formed by an aperture provided in a flange of the inner sheet of the lid and, if desired, this flange may be reinforced by a piece of sheet metal. If desired, however, a separate bracket may be provided to constitute the bearing 120.

Arm 121 is provided at its other end with an offset pin member 126 rotatably secured in recess means provided in link 122. Link 122 is similar to ling 22 of FIGURE 2.

The torsional spring rod 18 may be either straight as shown in FIG. 1 or may be provided with a loop, such as the loop 41 shown in FIG. 5 for the purpose of increasing its flexibility, if desired. The bracket 33 to 36 may be mounted on the lid in reversed position so that the end portion 19 of the spring rod will point upwardly, when the lid is in opened position.

From the foregoing it will be seen that this invention is one well adapted to attain all of the ends and objects hereinabove set forth, together with other advantages which are obvious and which are inherent to the mechanism.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. The combination comprising a compartment composed of a bottom wall, of a rear wall, and of side walls, a lid mounted for pivotal movement about an axis extending in proximity to the top edge of said rear wall, means for balancing the weight of said lid in its lowermost position and for exerting a lifting couple on said lid when it approaches its uppermost position, comprising a torsional spring rod mounted on said lid to extend parallel to said axis at a distance therefrom and having its one end fixed to said lid and its other end rotatably mounted on said lid, an arm fixed to said spring rod at said other end extending towards said bottom wall near one side wall, a link having one of its ends pivotally mounted on one of said two last-mentioned walls and having its other end pivotally connected to the end of said arm, said one end of said spring rod being bent to extend at an angle to said rod, a U-shaped bracket composed of a web portion and of offset arm portions, said web portion being fixed to said lid, said arm portions being provided with recess means to embrace said end portion of said spring rod to prevent rotation of said rod.

2. The combination claimed in claim 1 in which said arm portions include a first arm on one end of said bracket and a second arm and a third arm on the other end of said bracket, said third arm being spaced from said second arm transversely of said spring rod, the latter extending between said arms, said first arm and said second arm having recesses comprising said recess means in opposed edges for engagement by said end portion of said spring rod.

3. The combination comprising a compartment composed of a bottom wall, of a rear wall, and of side walls, a lid mounted for pivotal movement about an axis extending in proximity to the top edge of said rear wall, means for balancing the weight of said lid in its lowermost position and for exerting a lifting couple on said lid when it approaches its uppermost position, comprising a torsional spring rod mounted on said lid to extend parallel to said axis at a distance therefrom and having its one end fixed to said lid and its other end rotatably mounted on said lid, an arm fixed to said spring rod at said other end extending towards said bottom wall near one side wall, a link having one of its ends pivotally mounted on one of said two last-mentioned walls and having its other end pivotally connected to the end of said arm, said arm being integral with said spring rod, the end of said arm being constituted by an offset portion, said link having an aperture at one end thereof, and said offset portion being pivotally disposed in said aperture.

4. The combination claimed in claim 3 in which said torsional spring rod and said arm are formed by a single leaf spring bent at a right angle and provided with a bearing pin near its bend at the outside thereof.

5. The combination comprising a compartment composed of a bottom wall, of a rear wall, and of side walls, a lid mounted for pivotal movement about an axis extending in proximity to the top edge of said rear wall, means for balancing the weight of said lid in its lowermost position and for exerting a lifting couple on said lid when it approaches its uppermost position, comprising a torsional spring rod mounted on said lid to extend parallel to said axis at a distance therefrom and having its one end fixed to said lid and its other end rotatably mounted on said lid, an arm fixed to said spring rod at said other end extending towards said bottom wall near one side wall, a link having one of its ends pivotally mounted on one of said two last-mentioned walls and having its other end pivotally connected to the end of said arm, a bracket mounted on said lid near one side edge thereof for fixedly holding said one end of said spring rod, said bracket comprising arm members having recesses therein, said one end being received in said recesses and a bearing mounted on said lid near the other side edge thereof for rotatably holding said other end of said spring rod.

6. The combination claimed in claim 5 in which said lid is composed of an outer sheet and an inner sheet, said torsional spring rod being disposed within the space between said sheets.

7. The combination comprising a compartment composed of a bottom wall, of a rear wall, and of side walls, a lid mounted for pivotal movement about an axis extending in proximity to the top edge of said rear wall, means for balancing the weight of said lid in its lowermost position and for exerting a lifting couple on said lid when it approaches its uppermost position, comprising a torsional spring rod mounted on said lid to extend parallel to said axis at a distance therefrom and having its one end fixed to said lid and its other end rotatably mounted on said lid, an arm fixed to said spring rod at said other end extending towards said bottom wall near one side wall, and a link having one of its ends pivotally mounted on one of said two last-mentioned walls and having its other end pivotally connected to the end of said arm, said link being formed by a sheet metal member of U-shaped cross section having a pair of spaced web portions, one of said web portions being provided with an aperture, said arm extending between said web portions and having a bent end portion journaled in said aperture, said link being further provided with an abutment limiting the angle of oscillation of said arm relative to said link so as to prevent a straightening of the toggle formed by said arm and said link.

References Cited in the file of this patent

UNITED STATES PATENTS

| | | |
|---|---|---|
| 477,571 | Paine | June 21, 1892 |
| 1,859,563 | Joekel | May 24, 1932 |
| 2,783,495 | Vigmostad | Mar. 5, 1957 |
| 2,799,891 | Ragsdale | July 23, 1957 |